United States Patent
Kim et al.

(10) Patent No.: US 12,094,140 B2
(45) Date of Patent: Sep. 17, 2024

(54) APPARATUS AND METHOD OF GENERATING DEPTH MAP

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jungwoo Kim, Hwaseong-si (KR); Dusik Park, Yongin-si (KR); Jonghwan Ko, Daejeon (KR); Jaehyuk Choi, Seoul (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 337 days.

(21) Appl. No.: 17/540,927

(22) Filed: Dec. 2, 2021

(65) Prior Publication Data
US 2022/0392090 A1    Dec. 8, 2022

(30) Foreign Application Priority Data
Jun. 8, 2021 (KR) ......................... 10-2021-0074307

(51) Int. Cl.
G06T 7/70  (2017.01)
G06T 7/521  (2017.01)
G06T 7/593  (2017.01)

(52) U.S. Cl.
CPC ............. G06T 7/521 (2017.01); G06T 7/593 (2017.01); *G06T 2207/10028* (2013.01)

(58) Field of Classification Search
CPC ............. G06T 7/50; G06T 2207/10016; G06T 2207/10028; G06T 2207/30196;
(Continued)

(56) References Cited

U.S. PATENT DOCUMENTS

| 10,242,455 B2 * | 3/2019 | Harmsen ................ G05D 1/106 |
| 2015/0085155 A1 * | 3/2015 | Diaz Spindola ......... H04N 9/00 348/222.1 |

(Continued)

FOREIGN PATENT DOCUMENTS

| JP | 6338603 B2 | 6/2018 |
| KR | 10-2018-0113525 A | 10/2018 |
| KR | 10-2021-0028589 A | 3/2021 |

*Primary Examiner* — Quan M Hua
(74) *Attorney, Agent, or Firm* — Sughrue Mion, PLLC (57) ABSTRACT

A depth map generation apparatus includes: a sensor array including a plurality of sensors configured to detect a received light arrival time; a control circuit array; and a processor configured to divide an acquisition time of at least one of the plurality of sensors into a first time window and a second time window; based on a detection result of the at least one sensor in the first time window and the second time window, generate first sub-frame information; based on the first sub-frame information, determine in which one of the first time window and the second time window an object is detected; generate second sub-frame information from the one of the first time window and the second time window in which the object is detected; and provide the first sub-frame information and the second sub-frame information for generation of an image frame.

20 Claims, 8 Drawing Sheets

(58) Field of Classification Search
CPC . G06T 2207/30232; G06T 2207/10024; G06T 7/55; G06T 7/0016; G06T 7/246; G06T 7/579; G06T 7/73; G06T 7/62; G06T 7/10; G06T 7/215; G02B 30/00; G02B 27/0101; G02B 6/08; G06V 40/103; G06V 20/46; G06V 20/647; G06V 20/41; G06V 20/44; G06V 20/52; G06V 40/1365; G06V 10/24; G06V 20/20

See application file for complete search history.

(56) References Cited

U.S. PATENT DOCUMENTS

| | | |
|---|---|---|
| 2016/0000398 A1 | 1/2016 | Raju et al. |
| 2017/0052065 A1 | 2/2017 | Sharma et al. |
| 2018/0189974 A1* | 7/2018 | Clark ................. G06N 3/04 |
| 2018/0278918 A1* | 9/2018 | Peri ................. H04N 23/698 |
| 2019/0056482 A1 | 2/2019 | Nagai et al. |
| 2019/0257948 A1 | 8/2019 | Birnbacher |
| 2021/0063579 A1 | 3/2021 | Kabuk |
| 2021/0089040 A1* | 3/2021 | Ebrahimi Afrouzi ................. A47L 9/2873 |

* cited by examiner

APPARATUS AND METHOD OF GENERATING DEPTH MAP

CROSS-REFERENCE TO RELATED APPLICATION

This application is based on and claims priority under 35 U.S.C. § 119 to Korean Patent Application No. 10-2021-0074307, filed on Jun. 8, 2021, in the Korean Intellectual Property Office, the disclosure of which is incorporated by reference herein in its entirety.

BACKGROUND

1. Field

Apparatuses and methods consistent with example embodiments relate to generating a depth map using time of flight (ToF).

2. Description of the Related Art

A depth map means an image or video including information about a distance from a view point to a surface of an object. Distance-related information included in a depth map, or "depth information", may be used in various fields such as object recognition, 3D modeling, 3D conversion, and the like, and thus, research to acquire precise depth information is gradually increasing.

Generally, depth information is acquired by obtaining a plurality of two-dimensional images through a plurality of cameras and extracting depth information from the obtained two-dimensional images. Recently, a method of acquiring depth information based on time of flight (ToF) that acquires depth information using light has been in the spotlight.

The ToF-based depth information acquisition method uses, to obtain depth information, the difference, or "ToF", between the light irradiation time and the arrival time of reflected light after irradiating light to an object, measuring the time the light is reflected, and arriving at the object. Since precise depth information can be acquired quickly, research on the ToF-based depth information acquisition methods is gradually increasing. It is important to precisely measure a light arrival time to increase precision or accuracy of depth information acquired through the ToF-based depth information acquisition method.

Accordingly, a method of measuring ToF using a sensor capable of measuring a light arrival time in units of pico seconds, e.g., a single photon avalanche diode (SPAD), and a multi-measurement technique such as time correlated single-photon counting (TCSPC) has been proposed. In a method of generating a depth map using TCSPC, a histogram regarding the light arrival time may be generated for each pixel in a measurement region or a region of interest (ROI), and a ToF value for each pixel may be determined based on the generated histogram.

At this time, the precision of the depth map may be determined by the temporal resolution of a histogram bin for each pixel. As a measurement area of the depth map becomes wider and the required depth map precision increases, higher capacity memory may be required.

When a small number of sensors are used, there is no difficulty in using a high capacity memory. However, when a large number of sensors are used, e.g., a 2D sensor array, the number of pixels in the measurement area increases, and thus there may be restrictions in increasing the size of memory. As a result, there may be restrictions in improving the precision of the generated depth map.

To solve the above problem, a method of acquiring high precision depth information while using a small memory size by performing coarse measurement and fine measurement twice within the time of acquiring one frame has been proposed.

In the case of the above-described method, although the precision of depth information may be increased, as two measurements are required in the process of acquiring one frame, the frame rate of an acquired frame may be reduced.

As the reduction of the frame rate may reduce a measurement speed of depth information, the need for a new depth map generation method that can acquire depth information quickly while maintaining high precision is emerging.

SUMMARY

One or more example embodiment provide an apparatus and a method of generating a depth map which may improve a depth map generation speed while maintaining quality of the depth map.

According to an aspect of the disclosure, a depth map generation apparatus may include: a sensor array including a plurality of sensors configured to detect a received light arrival time; a control circuit array including a plurality of control circuits respectively connected to the plurality of sensors; a processor operatively connected to the sensor array and the control circuit array, and configured to: divide an acquisition time of at least one sensor of the plurality of sensors into a first time window and a second time window; based on a detection result of the at least one sensor in the first time window and the second time window, generate first sub-frame information; based on the first sub-frame information, determine in which one of the first time window and the second time window an object is detected; generate second sub-frame information from the one of the first time window and the second time window in which the object is detected; and provide the first sub-frame information and the second sub-frame information for generation of an image frame including depth information of the object.

The plurality of sensors may include a single photon avalanche diode (SPAD).

The plurality of sensors may be arranged in a plurality of rows and columns.

The depth map generation apparatus may further include a memory configured to store the first sub-frame information, wherein the processor may be further configured to: based on a determination that the object is detected in the first time window, divide the first time window into a third time window and a fourth time window; and generate the second sub-frame information by updating a detection result of the at least one sensor in the third time window and the fourth time window, and the first sub-frame information stored in the memory.

The processor may be further configured to, based on a determination that the object is not detected during the acquisition time, stop generating additional sub-frame information.

The processor may be further configured to determine that the object is not detected when no light is received by the at least one sensor in the acquisition time.

The processor may be further configured to, based on the generated second sub-frame information, determine in which one of the third time window and the fourth time window the object is detected.

The processor may be further configured to: based on a determination that the object is detected in the third time window, divide the third time window into a fifth time window and a sixth time window; and generate third sub-frame information by updating a detection result of the at least one sensor in the fifth time window and the sixth time window and the second sub-frame information stored in the memory.

The processor may be configured to transmit the first sub-frame information, the second sub-frame information, and the third sub-frame information to an external processor in a form of a data packet of a single bit.

The processor may be further configured to stop generating additional sub-frame information based on a determination that a length of the fifth time window or the sixth time window is less than or equal to a preset length.

According to another aspect of the present disclosure, a depth map generation method may include: dividing an acquisition time of at least one sensor of a plurality of sensors configured to detect a received light arrival time into a first time window and a second time window; generating first sub-frame information based on a detection result of the at least one sensor in the first time window and the second time window; determining in which one of the first time window and the second time window an object is detected, based on the first sub-frame information; generating second sub-frame information from the one of the first time window and the second time window in which the object is detected; and providing the first sub-frame information and the second sub-frame information for generation of an image frame including depth information of the object.

The depth map generation method may further include: dividing the first time window into a third time window and a fourth time window based on a determination that the object is detected in the first time window; and generating the second sub-frame information by updating a detection result of the at least one sensor in the third time window and the fourth time window and the first sub-frame information.

The depth map generation method may further include: stopping generating additional sub-frame information based on a determination that the object is not detected during the acquisition time.

The depth map generation method may further include: determining in which one of the third time window and the fourth time window the object is detected, based on the second sub-frame information.

The depth map generation method may further include: dividing the third time window into a fifth time window and a sixth time window based on a determination that the object is detected in the third time window; and generating third sub-frame information by updating a detection result of the at least one sensor in the fifth time window and the sixth time window and the second sub-frame information.

According to another aspect of the disclosure, a depth map generation system may include: a sensor array including a plurality of sensors configured to detect a received light arrival time; a control circuit array including a plurality of control circuits respectively corresponding to the plurality of sensors; a first processor operatively connected to the sensor array and the control circuit array, and configured to: divide an acquisition time of at least one sensor of the plurality of sensors into a first time window and a second time window; generate first sub-frame information based on a detection result of the at least one sensor in the first time window and the second time window; determine in which one of the first time window and the second time window an object is detected, based on the first sub-frame information; and generate second sub-frame information from the one of the first time window and the second time window in which the object is detected; and a second processor operatively connected to the first processor, and configured to receive the first sub-frame information and the second sub-frame information from the first processor, and generate an image frame including depth information of the object based on the first sub-frame information and the second sub-frame information received from the first processor.

The first processor may be further configured to transmit the first sub-frame information to the second processor via a network that connects the first processor to the second processor.

The first processor may be further configured to transmit the first sub-frame information to the second processor in a form of a data packet of a single bit.

The first processor may be further configured to: divide the first time window into a third time window and a fourth time window, based on a determination that the object is detected in the first time window; and generate the second sub-frame information by updating a detection result of the at least one sensor in the third time window and the fourth time window, and the first sub-frame information stored in a memory of the depth map generation system.

The second processor may be further configured to stop generating additional sub-frame information based on a determination that the object is not detected during the acquisition time.

BRIEF DESCRIPTION OF THE DRAWINGS

The above and/or other aspects will be more apparent by describing certain example embodiments, with reference to the accompanying drawings, in which.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising" used herein do not necessarily include all constituent elements or steps described in the specification, but do not preclude the presence or addition of one or more other features or components or further include additional constituent elements or steps.

In the description of embodiments, when a constituent element "connects" or is "connected" to another constituent element, the constituent element contacts or is connected to the other constituent element directly or electrically through at least one of other constituent elements.

Terms such as "first" and "second" are used herein merely to describe a variety of constituent elements, but the constituent elements are not limited by the terms. Such terms are used only for the purpose of distinguishing one constituent element from another constituent element.

Figure 1:
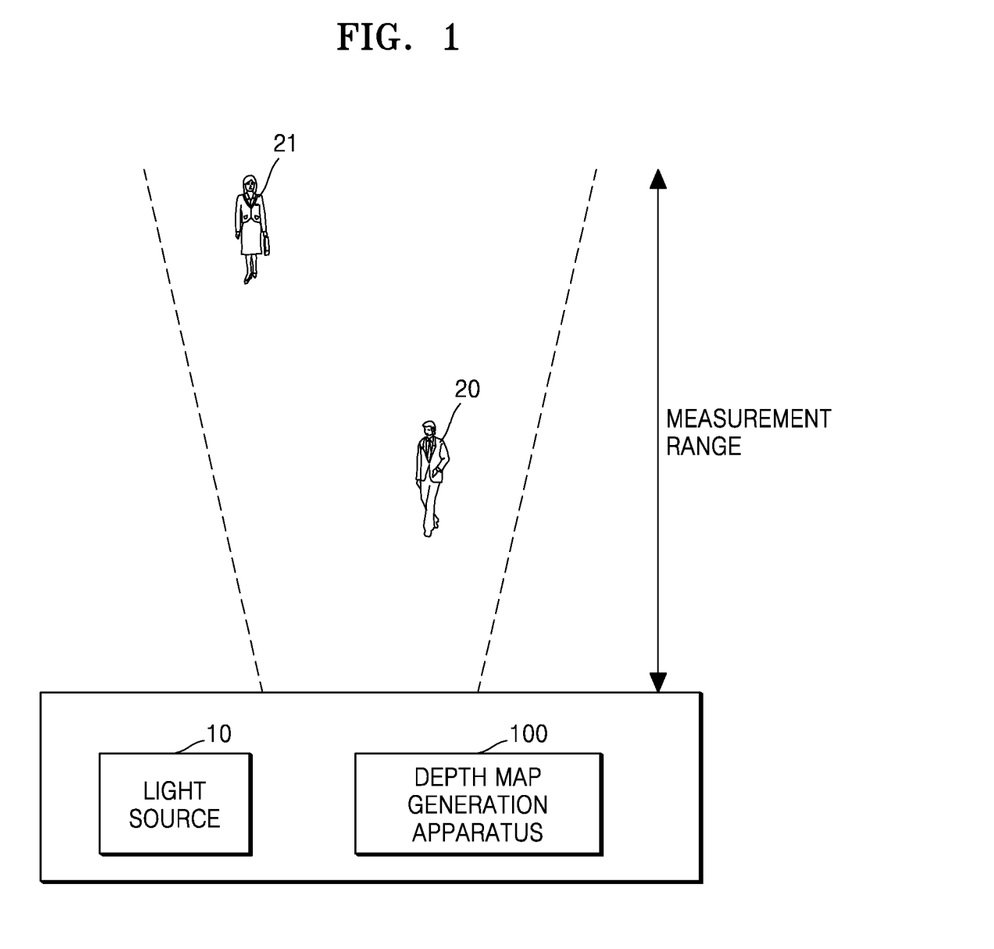
FIG. 1 is a schematic view of an operation of detecting an object by a depth map generation apparatus according to an example embodiment.

FIG. 1 is a schematic view of an operation of detecting an object, by a depth map generation apparatus 100 according to an example embodiment.

Referring to FIG. 1, the depth map generation apparatus 100 according to an example embodiment may generate a depth map of the objects 20 and 21 located within an acquisition range. In the disclosure, a "depth map" means an image or video including information about a distance from a view point of the depth map generation apparatus 100 to a surface of the objects 20 and 21, and the corresponding expression may be used as the same meaning below.

According to an example embodiment, the depth map generation apparatus 100 may generate a depth map of the objects 20 and 21 located within an acquisition range using time of flight of light (hereinafter, referred to as the ToF) generated in a light source 10. In the disclosure, the term "time of flight of light" or "ToF" may mean a difference between a light irradiation start time and a reflected light arrival time, and the corresponding expression may be used as the same meaning below.

The depth map generation apparatus 100 may measure, for example, a light arrival time of light irradiated from the light source 10 and returned after being reflected from the objects 20 and 21, calculate ToF, and calculate or estimate a distance from a view point of the depth map generation apparatus 100 to the objects 20 and 21, based on the calculated ToF.

In an example embodiment, the light source 10 may be a laser that generates light, for example, visible light, an infrared ray, or an ultraviolet ray, in a direction toward the acquisition range of the depth map generation apparatus 100. For example, the light source 10 may be a vertical cavity surface emitting laser (VCSEL) that generates pulse waves of a short cycle, but the disclosure is not limited thereto.

The light irradiated from the light source 10 may hit and may be reflected from the objects 20 and 21 located within an acquisition range of the depth map generation apparatus 100. The depth map generation apparatus 100 may detect light returned after being reflected through a sensor array, calculate a ToF, and acquire depth information of the objects 20 and 21 located within the acquisition range, based on the calculated ToF.

The depth map generation apparatus 100 according to an example embodiment of FIG. 1 may be used in various fields requiring three-dimensional (3D) distance measurement. For example, the depth map generation apparatus 100 may be implemented in the form of a chip and used to measure the length of an object or a distance between an object and an electronic apparatus(e.g., a mobile electronic apparatus). Further, the depth map generation apparatus 100 may model a space three dimensionally (3D modeling), and embody augmented reality (AR) in which a virtual object is arranged in a real space based on the 3D modeling.

However, the fields for utilizing the depth map generation apparatus 100 are not limited thereto, and According to an example embodiment, the depth map generation apparatus 100 may be applied to advanced driver assistance systems (ADAS) of a vehicle and mainly used as an auxiliary sensor, or applied to an autonomous vehicle and used to measure a structure of a space and a distance between the vehicle and other object. In another example, the depth map generation apparatus 100 may be applied to an unmanned aerial vehicle (UAV) and used for 3D mapping of a particular area, or applied to a robot and used to measure distance information needed for driving of a robot.

In the following description, the constituent elements of the depth map generation apparatus 100 according to an example embodiment are described in detail with reference to FIGS. 2, 3A, and 3B.

Figure 2:
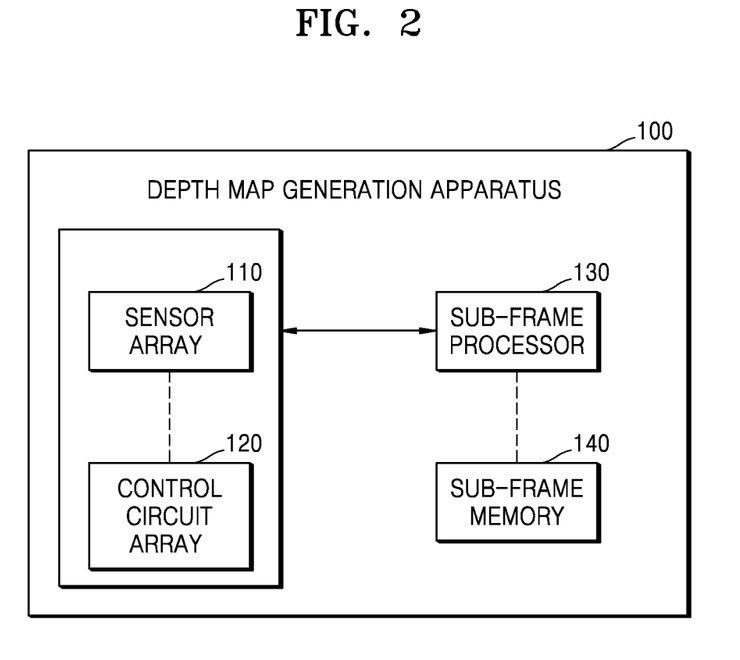
FIG. 2 is a block diagram of constituent elements of a depth map generation apparatus according to an example embodiment.

FIG. 2 is a block diagram of constituent elements of a depth map generation apparatus according to an example embodiment. FIG. 3A illustrates some constituent elements of a depth map generation apparatus according to an example embodiment. FIG. 3B illustrates a process of detecting a light arrival time of a first sensor of the depth map generation apparatus of FIG. 3A.

Figure 3A:
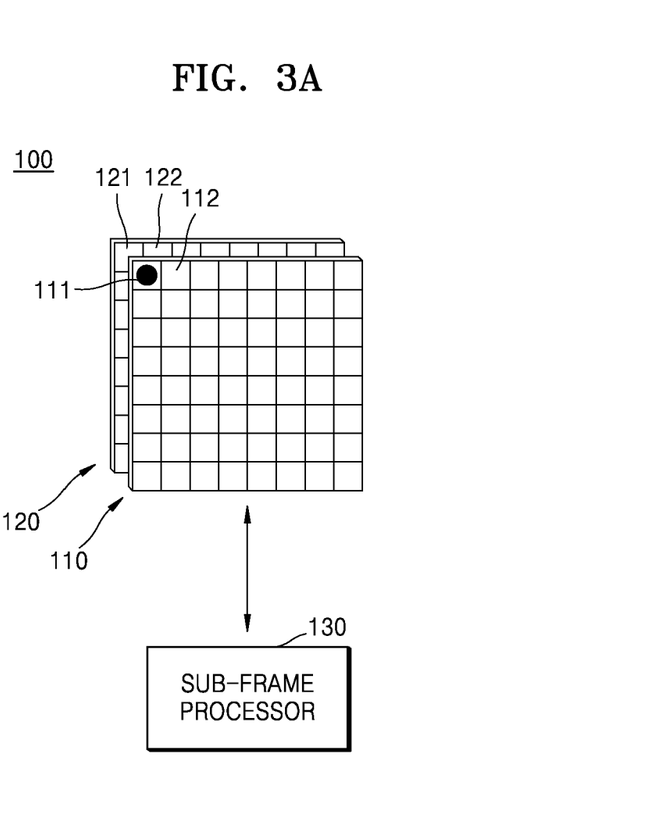
FIG. 3A illustrates some constituent elements of a depth map generation apparatus according to an example embodiment.

As the depth map generation apparatus 100 of FIGS. 2 and 3A may be an example embodiment of the depth map generation apparatus 100 of FIG. 1, redundant descriptions thereof are omitted.

Figure 3B:
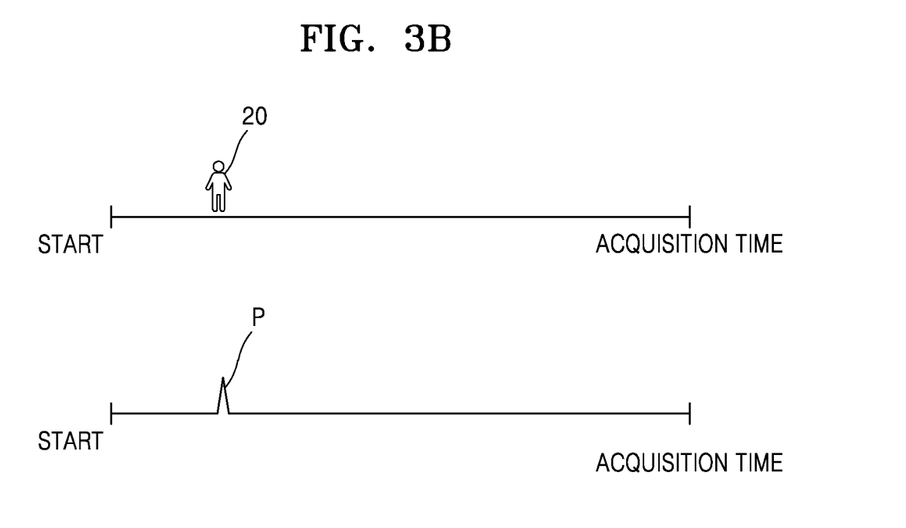
FIG. 3B illustrates a process of detecting a light arrival time of a first sensor of the depth map generation apparatus of FIG. 3A.

Referring to FIGS. 2, 3A, and 3B, the depth map generation apparatus 100 according to an example embodiment may include a sensor array 110, a control circuit array 120, a sub-frame processor 130, and a sub-frame memory 140. The constituent elements of the depth map generation apparatus 100 according to an example embodiment are not limited to the above-described constituent elements, and according to an example embodiment, other constituent elements may be added or any one constituent element may be omitted.

The sensor array 110 may include a plurality of sensors, for example, first and second first and second sensors 111 and 112, for detecting light that is irradiated from a light source, for example, the light source 10 of FIG. 1, and then reflected from an object, for example, the objects 20 and 21 of FIG. 1, located within an acquisition range of the depth map generation apparatus 100 object.

According to an example embodiment, the first and second sensors 111 and 112 may detect light reflected by the object and incident in a direction toward the first and second sensors 111 and 112, and generate signals or pulses corresponding to the detected light. The signals or pulses generated by the first and second sensors 111 and 112 may be transmitted to a plurality of control circuits 121 and 122 electrically or operatively connected to the first and second sensors 111 and 112.

The first and second sensors 111 and 112, for example, may include a single photon avalanche diode (SPAD) for detecting light of a small intensity at a high time resolution (e.g., 6.6 ps) by amplifying electrons of a single photon through avalanche multiplication, but the disclosure is not limited thereto.

According to an example embodiment, the sensor array 110 may be a two-dimensional sensor array in which the first and second sensors 111 and 112 are arranged in rows and columns. The first and second sensors 111 and 112 may be arranged to correspond to, for example, respective pixels of a region of interest (ROI). Although only the sensor array 110, in which the first and second sensors 111 and 112 are arranged in 8 rows and 8 columns, or an "8×8 matrix", to correspond to 8×8 pixels, is illustrated in the drawings, the arrangement structure of the first and second sensors 111 and 112 is not limited to the illustrated embodiment. In another example embodiment, the sensor array 110 may be a sensor array in which the first and second sensors 111 and 112 are arranged in an M×N matrix, where M and N are natural numbers, or a sensor array in which the first and second sensors 111 and 112 are arranged in a row.

The first and second sensors 111 and 112 that are arranged in a plurality of rows and columns may be used to acquire depth information or point cloud information for each pixel of an ROI, and the sub-frame processor 130 may generate a sub-frame through the depth information or point cloud information of an ROI for each pixel acquired from the first and second sensors 111 and 112.

The control circuit array 120 may include the control circuits 121 and 122 respectively connected to the first and second sensors 111 and 112 of the sensor array 110. For example, a first control circuit 121 may be arranged to correspond to the first sensor 111 to be electrically connected to the first sensor 111, and a second control circuit 122 may be arranged to corresponding to the second sensor 112 to be electrically connected to the second sensor 112.

In an example embodiment, the first sensor 111 and the second sensor 112 may include a plurality of first pixels and a plurality of second pixels, respectively, and the control circuit arrays 120 may include a plurality of circuits 121 and 122 that control the plurality of first pixels and the plurality of second pixels in a one-to-one relationship. The plurality of circuits 121 and 122 may control the plurality of first pixels and the plurality of second pixels by one-to-one correspondence, and may detect sensing signals from the plurality of first pixels and the plurality of second pixels, respectively. The control circuit array 120 may be also referred to as a pixel controller.

According to an example embodiment, the control circuits 121 and 122 may each include a histogram memory, and the histogram memory may store data about a light arrival time, or a "single photon generation time", for each pixel, which is detected by the first and second sensors 111 and 112. For example, the depth map generation apparatus 100 may generate a histogram about a light arrival time for each pixel using a time correlated single-photon counting (TCSPC) technique, and the histogram about a light arrival time for each pixel, which is generated through the above-described process may be stored in the histogram memory.

The sub-frame processor 130 may be electrically or operatively connected to the sensor array 110 and/or the control circuit array 120 and may acquire depth information of an object based on the data about a light arrival time for each pixel of an ROI, which is detected by the first and second sensors 111 and 112.

For example, the first sensor 111, as illustrated in FIG. 3B, may detect light returned after being reflected by an object 20 during an acquisition time, and generate a signal P, or a pulse, corresponding to the light arrival time. The sub-frame processor 130 may calculate a ToF based on the signal P corresponding to the light arrival time generated by the first sensor 111, and acquire depth information about a particular pixel of an ROI corresponding to the first sensor 111 through the calculated ToF and light movement speed.

According to an example embodiment, the sub-frame processor 130 may acquire depth information about a particular pixel of an ROI through the first sensor 111, and then sequentially acquire depth information about other the pixels through other sensors, for example, the second sensor 112, thereby generating sub-frame information about an ROI, but the disclosure is not limited thereto. According to another example embodiment, the sub-frame processor 130 may generate sub-frame information in a method of simultaneously acquiring depth information about an ROI through a plurality of sensors.

In the disclosure, the term "sub-frame information" may mean detailed frame information constituting one piece of frame information, and one piece of frame information may be generated by at least one sub-frame information. The corresponding expression may be used as the same meaning below, and a redundant description thereof is omitted.

According to an example embodiment, the sub-frame processor 130 may generate sub-frame information by dividing an acquisition time of the first and second sensors 111 and 112 into two time windows, and in which of the two divided time window an object is detected may be determined based on the generated sub-frame information.

In the disclosure, the term "time window" may mean a specific time period, and the length of a time window or the length of a time period may be variable by the sub-frame processor 130. The corresponding expression may be used as the same meaning below, and a redundant description thereof is omitted.

In an example embodiment, the sub-frame processor 130 may determine in which time window an object is detected, based on the signal P generated from the first and second sensors 111 and 112 corresponding to the light arrival time.

In an example, when the acquisition time of the first sensor 111 is divided into a first time window and a second time window and the signal P corresponding to the light arrival time is generated by the first sensor 111 within the first time window, the sub-frame processor 130 may determine that the object (e.g., the object 20 of FIG. 3B) is detected in the first time window.

In another example, when the signal P corresponding to the light arrival time is generated by the first sensor 111 within the second time window, the sub-frame processor 130 may determine that the object is detected in the second time window. In another example, when no signal is generated by the first sensor 111 within the ranges of the first time window and the second time window, the sub-frame processor 130 may determine that the object is not detected within an acquisition time or acquisition range of the first sensor 111.

According to an example embodiment, the sub-frame processor 130 may divide again the time window in which the object is determined to be detected into two time windows, and generate new sub-frame information by updating the detection result of the first and second sensors 111 and 112 in the two divided time windows and previously generated sub-frame information.

As the sub-frame processor 130 continuously generates the new sub-frame information by repeating the process of dividing again the time window in which the object is determined to be detected into two time windows, the sub-frame processor 130 may contribute to generation of depth map information having high precision. However, a detailed description thereof is presented below.

According to an example embodiment, when no object is determined to be detected within the acquisition time or acquisition range of at least one of the first sensor 111 or the second sensor 112, the sub-frame processor 130 may stop the generation of sub-frame information using a sensor that detected no object.

In the previously proposed methods of generating a depth map, even when no object is detected in a particular pixel, all measurements for acquiring frame information about the corresponding pixel, for example, coarse measurement and fine measurement, are needed to be performed so that it was difficult to reduce a time to acquire one piece of frame information.

In contrast, in the depth map generation apparatus 100 according to an example embodiment, when the sub-frame processor 130 divides the entire acquisition time into two time windows and no object is determined to be detected within ranges of the two divided time windows, the generation of sub-frame information is stopped so that unnecessary additional measurement may be omitted in the generation of a depth map. Consequently, the depth map generation apparatus 100 according to an example embodiment may improve or enhance a depth map generation speed through the above-described operation of the sub-frame processor 130.

According to an example embodiment, the sub-frame processor 130 may generate sub-frame information and transmit or output the generated sub-frame information to an external processor, thereby generating a complete frame, and a detailed description thereof is presented below.

The sub-frame memory 140 may be electrically or operatively connected to the sub-frame processor 130, and may store the sub-frame information generated by the sub-frame processor 130.

According to an example embodiment, first sub-frame information generated by the sub-frame processor 130 may be stored in the sub-frame memory 140, and the first sub-frame information stored in the sub-frame memory 140 may be used to generate second sub-frame information.

In the following description, the operations of generating sub-frame information, by the depth map generation apparatus 100, are described in detail with reference to FIGS. 4 through 8.

Figure 4:
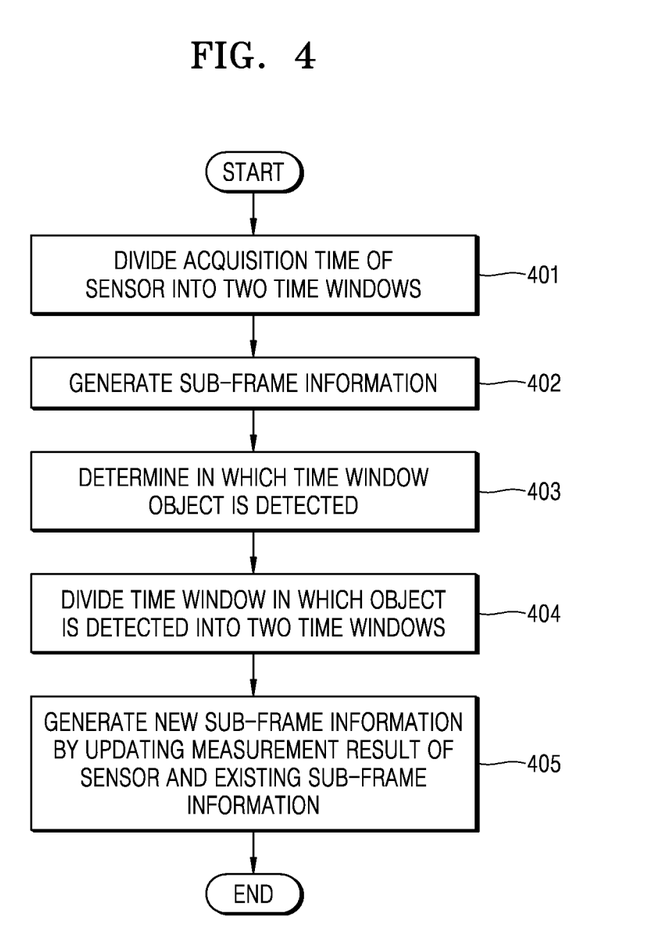
FIG. 4 is a flowchart of operations of generating sub-frame information, in a depth map generation apparatus according to an example embodiment.

FIG. 4 is a flowchart of operations of generating sub-frame information, in a depth map generation apparatus according to an example embodiment. Hereinafter, in describing the operations of generating sub-frame information, by the depth map generation apparatus of FIG. 4, the constituent elements of the depth map generation apparatus 100 of FIGS. 2 and 3A are referred to.

Referring to FIG. 4, in operation 401, the sub-frame processor 130 of the depth map generation apparatus 100 according to an example embodiment may divide a period (hereinafter, referred to as the "acquisition time"), in which light reflected from an object is measured by the first and second sensors 111 and 112 of the sensor array 110, into two time windows.

In an example embodiment, the sub-frame processor 130 may divide the acquisition time of at least one of the first sensor 111 or the second sensor 112 into a first time window ad a second time window. For example, the sub-frame processor 130 may divide the acquisition time of the first sensor 111 into a first time window and a second time window, but the disclosure is not limited thereto. In another example, the sub-frame processor 130 may simultaneously divide the acquisition times of the first sensor 111 and the second sensor 112 into two time windows.

Although the lengths of the first time window and the second time window may be substantially the same, the disclosure is not limited thereto, and according to an example embodiment, the length of the first time window and the length of the second time window may be different from each other.

In operation 402, the sub-frame processor 130 of the depth map generation apparatus 100 according to an example embodiment may generate sub-frame information based on a measurement result of at least one of the first sensor 111 or the second sensor 112 during the acquisition time divided into two time windows. The generated sub-frame information may be transmitted or output by the sub-frame processor 130 to the external processor, for example, a microcontroller unit (MCU) of a vehicle, and stored in the sub-frame memory 140 that is electrically or operatively connected to the sub-frame processor 130.

In operation 403, the sub-frame processor 130 of the depth map generation apparatus 100 according to an example embodiment may determine in which one of the two divided time windows the object is detected, based on the sub-frame information generated through operation 402.

According to an example embodiment, the sub-frame processor 130 may determine in which time window the object is detected, based on the signal P, or "pulse," generated by at least one of the first sensor 111 or the second sensor 112.

For example, the first and second sensors 111 and 112 may detect light returning after being reflected from the object, and generate the signal P corresponding to the light arrival time. The sub-frame processor 130 may determine in which time window the object is detected, based on the generation of the signal P by the first and second sensors 111 and 112 and/or the generation time of the signal P.

In an example, when the signal P generated by at least one of the first sensor 111 or the second sensor 112 is detected within a range of the first time window of the two divided time windows (hereinafter, referred to as the "first time window"), the sub-frame processor 130 may determine that the object is detected in the first time window.

In another example, when the signal P generated by at least one of the first sensor 111 or the second sensor 112 is detected within a range of the second time window of the two divided time windows (hereinafter, referred to as the "second time window"), the sub-frame processor 130 may determine that the object is detected in the second time window.

In operation 404, the sub-frame processor 130 of the depth map generation apparatus 100 according to an example embodiment may divide again the time window in which the object is detected, into two time windows, based on the determination result of operation 403.

In an example embodiment, the sub-frame processor 130 may divide again the first time window into two time windows, based on the determination that the object is detected in the first time window. For example, the sub-frame processor 130 may divide the first time window into a third time window and a fourth time window.

In another example embodiment, the sub-frame processor 130 may divide again the second time window into two time windows, based on the determination that the object is detected in the second time window.

In operation 405, the sub-frame processor 130 of the depth map generation apparatus 100 according to an example embodiment may generate new sub-frame information by updating the measurement result of at least one of the first sensor 111 or the second sensor 112 in the two time windows that are divided again in operation 404 and sub-frame information previously generated in operation 402.

According to an example embodiment, when the first time window is divided into the third time window and the fourth time window in operation 404, the sub-frame processor 130 may update the measurement result of at least one of the first sensor 111 or the second sensor 112 in the third time window and the fourth time window and the sub-frame information previously stored the sub-frame memory 140. New sub-frame information may be generated through the above-described update of the sub-frame processor 130, and the new sub-frame information may be stored in the sub-frame memory 140, and transmitted or output to the external processor.

The depth map generation apparatus 100 according to an example embodiment may repeat operations 403 to 405 to generate a plurality of pieces of new sub-frame information and transmit the generated sub-frame information to the external processor. In the following description, the process of generating and transmitting sub-frame information is described in detail with reference to FIGS. 5 to 8.

Figure 5:
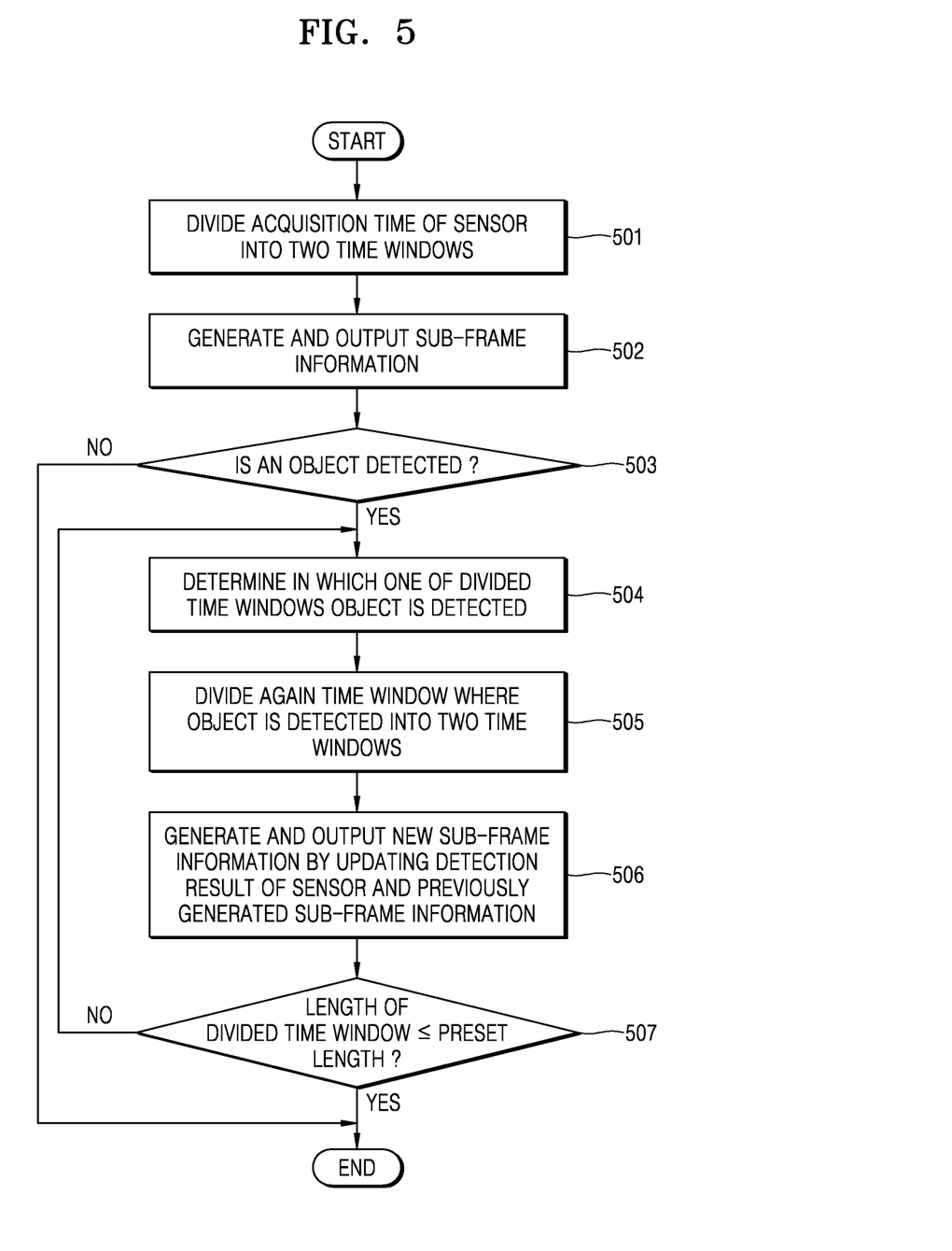
FIG. 5 is a flowchart of operations of generating by dividing a time window, in a depth map generation apparatus according to an example embodiment.
Figure 6:
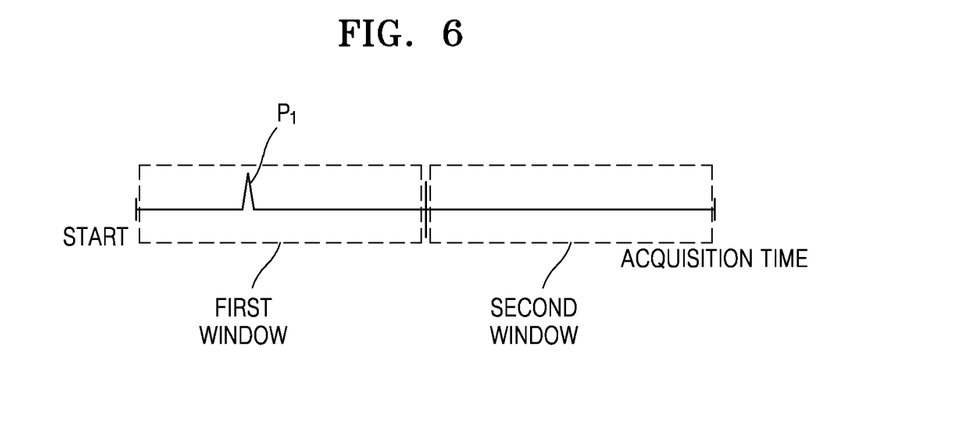
FIG. 6 is a graph showing a signal detected by a sensor in a state in which an acquisition time is divided into a first time window and a second time window, in a depth map generation apparatus according to an example embodiment.
Figure 7:
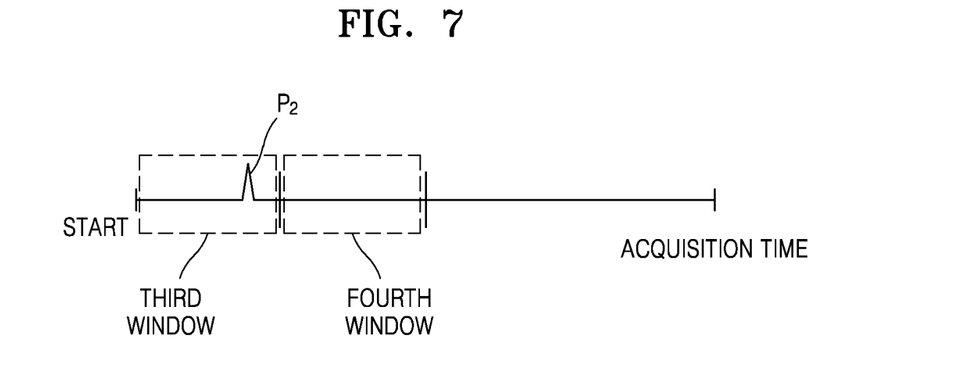
FIG. 7 is a graph showing a signal detected by a sensor in a state in which the first time window is divided into a third time window and a fourth time window, in a depth map generation apparatus according to an example embodiment.
Figure 8:
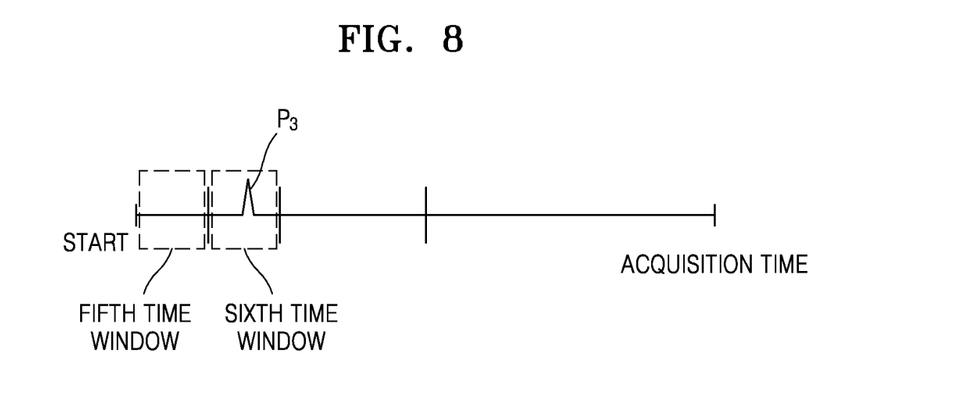
FIG. 8 is a graph showing a signal detected by a sensor in a state in which the third time window is divided into a fifth time window and a sixth time window, in a depth map generation apparatus according to an example embodiment.

FIG. 5 is a flowchart of operations of generating by dividing a time window, in the depth map generation apparatus 100 according to an example embodiment. FIG. 6 is a graph showing a signal detected by a sensor in a state in which an acquisition time is divided into a first time window and a second time window, in the depth map generation apparatus 100 according to an example embodiment;

FIG. 7 is a graph showing a signal detected by a sensor in a state in which the first time window is divided into a third time window and a fourth time window, in the depth map generation apparatus 100 according to an example embodiment. FIG. 8 is a graph showing a signal detected by a sensor in a state in which the third time window is divided into a fifth time window and a sixth time window, in the depth map generation apparatus 100 according to an example embodiment;

In describing the operations of generating sub-frame information by the depth map generation apparatus 100 in FIG. 5, the constituent elements of the depth map generation apparatus 100 of FIGS. 2 and 3A are referred to.

Referring to FIGS. 5, 6, 7, and 8, in operation 501, the sub-frame processor 130 of the depth map generation apparatus 100 according to an example embodiment may divide the acquisition time of at least one of the first sensor 111 or the second sensor 112 into two time windows.

Referring to FIG. 6, the sub-frame processor 130 of the depth map generation apparatus 100 according to an example embodiment may divide the acquisition time of at least one sensor, for example, the first sensor 111, into the first time window and the second time window. Operation 501 may be substantially the same as or similar to operation 401 of FIG. 4, and a redundant description thereof is omitted below.

In operation 502, the sub-frame processor 130 of the depth map generation apparatus 100 according to an example embodiment may generate sub-frame information based on the measurement result of at least one of the first sensor 111 or the second sensor 112 during the acquisition time divided into two time windows, and output or transmit the generated sub-frame information to the external processor.

According to an example embodiment, the sub-frame processor 130 may generate first sub-frame information based on the detection result, or "measurement result", of the at least one sensor, for example, the first sensor 111 in the first time window and the second time window in operation 501, and generate first sub-frame information. The generated first sub-frame information may be stored in the sub-frame memory 140, and output or transmitted by the sub-frame processor 130 to the external processor. Operation 502 may be substantially the same as or similar to operation 402 of FIG. 4, and a redundant description thereof is omitted below.

In operation 503, the sub-frame processor 130 of the depth map generation apparatus 100 according to an example embodiment may determine whether the object is detected, based on the sub-frame information generated in operation 502.

According to an example embodiment, as illustrated in FIG. 6, when a signal (e.g., $P_1$ of FIG. 6), corresponding to the light arrive time is generated by at least one of the first sensor 111 or the second sensor 112 within the ranges of the first time window and the second time window, the sub-frame processor 130 may determine that the object is detected in a pixel corresponding to the at least one sensor.

According to another example embodiment, when no signal is generated by the at least one sensor within the ranges of the first time window and the second time window, the sub-frame processor 130 may determine that the object is not detected in a pixel corresponding to the at least one sensor.

When the object is determined in operation 503 to be detected within the ranges of the two divided time windows, in operation 504, the sub-frame processor 130 of the depth map generation apparatus 100 according to an example embodiment may determine in which one of the two divided time windows the object is detected.

According to an example embodiment, as illustrated in FIG. 6, when the signal $P_1$ generated by at least one of the first sensor 111 or the second sensor 112, for example, the first sensor 111, is detected within the range of the first time window, the sub-frame processor 130 may determine that the object is detected in the first time window.

According to another example embodiment, when the signal $P_1$ generated by the at least one sensor is detected within the range of the second time window, the sub-frame processor 130 may determine that the object is detected in the second time window.

Unlike the above, when the object is not determined in operation 503 to be detected within the range of the two divided time windows, the sub-frame processor 130 of the depth map generation apparatus 100 according to an example embodiment may stop the generation of sub-frame information.

When the object is not determined to be detected during the acquisition time of the at least one sensor, for example, the first sensor 111, the depth map generation apparatus 100 according to an example embodiment stops the generation of sub-frame information so that unnecessary additional measurement is not performed, and as a result, a depth map generation speed of the depth map generation apparatus 100 may be improved.

In operation 505, the sub-frame processor 130 of the depth map generation apparatus 100 according to an example embodiment may divide again the time window in which the object is detected into two time windows based on the determination result in operation 504.

Referring to FIG. 7, the sub-frame processor 130 of the depth map generation apparatus 100 according to an example embodiment may divide again the first time window into a third time window and a fourth time window, based on the determination that the object is detected in the first time window.

In operation 506, the sub-frame processor 130 of the depth map generation apparatus 100 according to an example embodiment may generate new sub-frame information by updating the detection result, or "measurement result," of the at least one sensor in the two time windows divided in operation 505 and the sub-frame information generated in operation 502. The generated new sub-frame information may be stored in the sub-frame memory 140, and transmitted or output by the sub-frame processor 130 to the external processor.

According to an example embodiment, when the first time window is divided in operation 505 into the third time window and the fourth time window, the sub-frame processor 130 may update the detection result of the at least one sensor, for example, the first sensor 111 in the third time window and the fourth time window and the first sub-frame information previously stored in the sub-frame memory 140.

As the sub-frame processor 130 updates the detection result of the at least one sensor in the third time window and the fourth time window and the first sub-frame information, new second sub-frame information may be generated. The generated second sub-frame information may be stored in the sub-frame memory 140, and transmitted or output by the sub-frame processor 130 to the external processor.

In operation 507, the sub-frame processor 130 of the depth map generation apparatus 100 according to an example embodiment may compare the length of a time window divided through operation 505 with a preset length. In the disclosure, the term "preset length" may mean the length of a time window to generate a depth map with a preset resolution, and the corresponding expression may be used as the same meaning below.

According to an example embodiment, the lengths of the third time window and/or the fourth time window divided in operation 505 is determined to be greater than the preset length, the sub-frame processor 130 may determine that generation of additional sub-frame information is necessary to generate a depth map with a preset resolution, and repeatedly perform operations 504 to 507.

In an example, when the lengths of the third time window and/or the fourth time window are determined to be greater than the preset length, the sub-frame processor 130 may determine in which one of the third time window and the fourth time window the object is detected, based on the generated second sub-frame information.

The sub-frame processor 130 may determine whether the object is detected either in the third time window or in the fourth time window, based on a signal, for example, $P_2$ of FIG. 7, generated by the at least one sensor within the ranges of the third time window and the fourth time window.

For example, the sub-frame processor 130 may divide again the third time window into a fifth time window and a sixth time window, based on the determination that the object is detected in the third time window as illustrated in FIG. 8.

Furthermore, the sub-frame processor 130 may generate third sub-frame information by updating the detection result of the at least one sensor in the fifth time window and the sixth time window and the second sub-frame information previously stored in the sub-frame memory 140, and output the generated third sub-frame information to the external processor.

When the lengths of the divided fifth time window and/or sixth time window are determined to be greater than or equal to the preset length, the sub-frame processor 130 may repeatedly perform the above-described operations based on the signal $P_3$ generated by the at least one sensor.

In another example embodiment, when the lengths of the third time window and/or the fourth time window are determined to be less than or equal to the preset length, the sub-frame processor 130 may determine that sufficient sub-frame information to generate a depth map with a preset resolution is generated, and stop the generation of additional sub-frame information.

The depth map generation apparatus 100 according to an example embodiment may generate a plurality of pieces of sub-frame information to generate a depth map with a preset resolution, and output or transmit the generated sub-frame information to the external processor through the above-described operations 501 to 507.

According to an example embodiment, the depth map generation apparatus 100 may generate a plurality of pieces of sub-frame information in the form of a data packet of a single bit (1 bit) and output or transmit the sub-frame information to the external processor, thereby reducing hardware resource of the sub-frame memory 140 and improving a data transmission speed.

In the existing depth map generation apparatus, frame information having capacity of about 5 to 10 bits is generated through a plurality of pieces of sub-frame information, and the generated frame information is output to an external processor. In the above-described depth map generation apparatus, it is a problem that a large capacity memory is necessary to generate a high-resolution depth map, a lot of time is taken to transmit a large amount of data.

In contrast, according to the depth map generation apparatus 100 according to an example embodiment, by storing sub-frame information in the form of a data packet of a single bit, not only the hardware resource of the sub-frame memory 140 where sub-frame information is stored may be reduced, but also a low amount of data is output or transmitted to the external processor, thereby improving a data transmission speed.

In the following description, the operation of transceiving sub-frame information in a depth map generation system including the depth map generation apparatus 100 is described in detail with reference to FIGS. 9 and 10.

Figure 9:
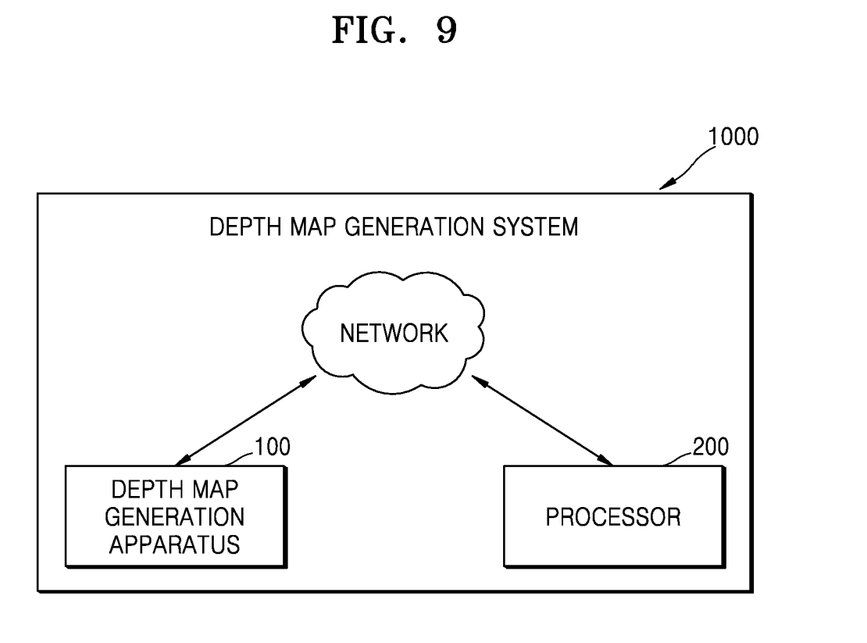
FIG. 9 is a schematic block diagram of constituent elements of a depth map generation system according to an example embodiment.

FIG. 9 is a schematic block diagram of constituent elements of a depth map generation system 1000 according to an example embodiment. FIG. 10 is a flowchart of an operation of transceiving sub-frame information in the depth map generation system 1000 according to an example embodiment.

As the depth map generation apparatus 100 of FIGS. 9 and 10 may be substantially the same as or similar to the depth map generation apparatus 10 of FIG. 2 and/or FIG. 3A, a redundant description thereof is omitted below.

Figure 10:
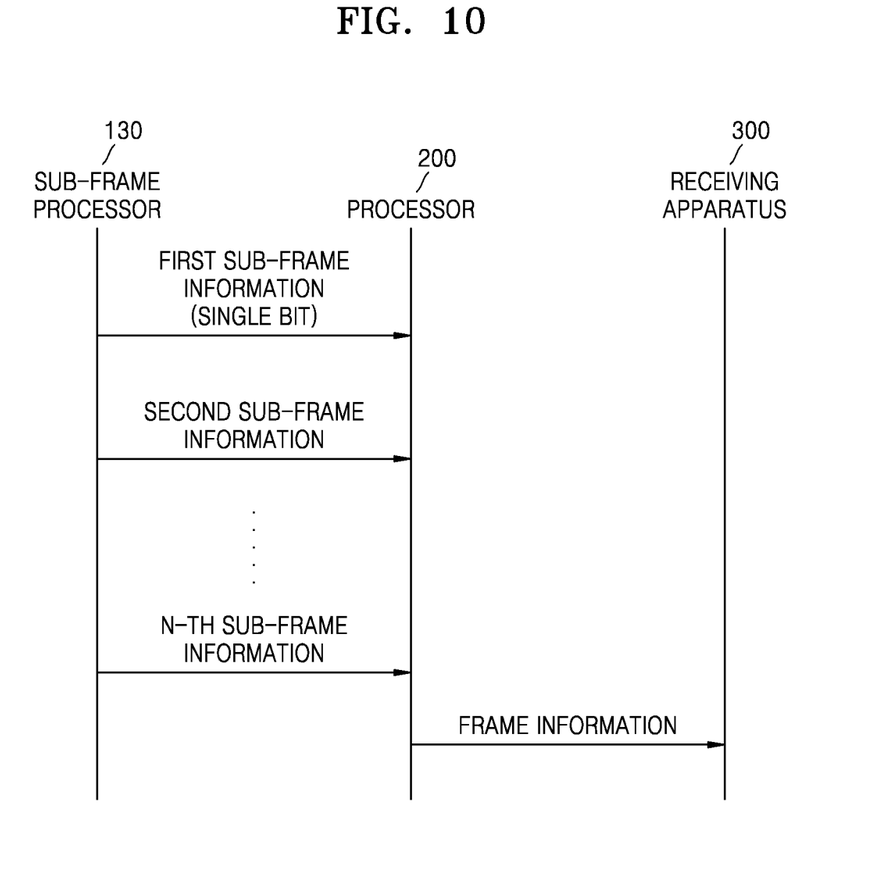
FIG. 10 is a flowchart of an operation of transceiving sub-frame information in a depth map generation system according to an example embodiment.

Referring to FIGS. 9 and 10, the depth map generation system 1000 according to an example embodiment may include the depth map generation apparatus 100 (e.g., the depth map generation apparatus 100 of FIG. 2 or FIG. 3A) and a processor 200 electrically or operatively connected to the depth map generation apparatus 100.

The depth map generation system 1000 according to an example embodiment may be a system that is applied to at least one of an electronic apparatus (e.g., a mobile electronic apparatus), a vehicle, an UAV, and a robot and generates a depth map. However, the application range of the depth map generation system 1000 is not limited thereto.

The depth map generation apparatus 100 may generate a plurality of pieces of sub-frame information to generate frame information through operations 401 to 405 of FIG. 4 and/or operations 501 to 507 of FIG. 5.

According to an example embodiment, sub-frame information generated by a sub-frame processor, for example, the sub-frame processor 130 of FIGS. 2 and 3A, of the depth map generation apparatus 100 may be in the form of a data packet of a single bit, and the sub-frame information of a single bit may be transmitted to the processor 200 electrically or operatively connected to the sub-frame processor of the depth map generation apparatus 100.

For example, the depth map generation apparatus 100 may generate first sub-frame information, second sub-frame information, and N-th sub-frame information, where N is a natural number, which are of a single bit, and the generated first to N-th sub-frame information may be transmitted or output by the sub-frame processor to the processor 200.

According to an example embodiment, the depth map generation apparatus 100 may transmit a plurality of pieces of sub-frame information via a network that connects the depth map generation apparatus 100 to the processor 200. In an example, the depth map generation apparatus 100 may transmit a plurality of pieces of sub-frame information to the processor 200 through a long-range communication network such as a cellular network, the Internet, or a computer network, for example, LAN or WAN, but the disclosure is not limited thereto. In another example, the depth map generation apparatus 100 may transmit a plurality of pieces of sub-frame information to the processor 200 through a short-range communication network such as Bluetooth, WiFi direct, or infrared data association (IrDA). Furthermore, the above-described network may use Ethernet protocols, but the disclosure is not limited thereto.

In the depth map generation system 1000 according to an example embodiment, as the depth map generation apparatus 100 transmits a small amount, for example, a single bit, of sub-frame information to the processor 200, a transmission time of sub-frame information may be shortened. Accordingly, a speed of generating a frame corresponding to a depth map of the depth map generation system 1000 may be improved.

The processor 200 may be electrically or operatively connected to the depth map generation apparatus 100 and may receive a plurality of pieces of sub-frame information from the depth map generation apparatus 100 and generate frame information based on the received sub-frame information. In the disclosure, the term "frame information" may mean information that is generated as a plurality of pieces of sub-frame information are updated, and the above-described frame information may be information corresponding to a depth map of a depth ROI.

The processor 200 may generate frame information corresponding to the depth map of ROI based on the sub-frame information received from the depth map generation apparatus 100, and transmit the generated frame information to a receiving apparatus 300.

According to an example embodiment, the receiving apparatus 300 may mean an apparatus capable of dividing and/or extracting various information from the frame information corresponding to the depth map. The receiving apparatus 300 may be, for example, a display, a computer, or other processors distinguished from a sub-frame processor or the processor 200, but the disclosure is not limited thereto.

An example embodiment of the disclosure may be embodied in the form of a recording medium including computer executable instructions, such as a program module executed by a computer. A computer-readable storage medium may be a usable medium that is accessible by a computer and may include all of volatile and non-volatile media and separable and inseparable media. Furthermore, the computer-readable medium may include all of computer storage media and communication media. The computer storage media may include all of volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanism, and may also include information transmission media.

According to the apparatus and method of generating a depth map according to the embodiment of the disclosure, by transmitting sub-frame information that is not a completed frame to the external processor, not only hardware resource of a memory may be reduced, but also an information transmission speed may be improved, thereby improving a depth map generation speed.

Furthermore, according to the depth map generation apparatus method according to the embodiment of the disclosure, the presence of an object is determined in a measurement process through a sensor, and when no object is present, additional generation of sub-frame information is stopped so that the depth map generation speed may be improved.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A depth map generation apparatus comprising:
   a sensor array comprising a plurality of sensors configured to detect a received light arrival time;
   a control circuit array comprising a plurality of control circuits respectively connected to the plurality of sensors;
   a processor operatively connected to the sensor array and the control circuit array, and configured to:
   divide an acquisition time of at least one sensor of the plurality of sensors into a first time window and a second time window;
   based on a detection result of the at least one sensor in the first time window and the second time window, generate first sub-frame information;

based on the first sub-frame information, determine in which one of the first time window and the second time window an object is detected;
generate second sub-frame information from the one of the first time window and the second time window in which the object is detected; and
provide the first sub-frame information and the second sub-frame information for generation of an image frame that comprises depth information of the object.

2. The depth map generation apparatus of claim 1, wherein the plurality of sensors comprise a single photon avalanche diode (SPAD).

3. The depth map generation apparatus of claim 2, wherein the plurality of sensors are arranged in a plurality of rows and columns.

4. The depth map generation apparatus of claim 1, further comprising a memory configured to store the first sub-frame information,
wherein the processor is further configured to:
based on a determination that the object is detected in the first time window, divide the first time window into a third time window and a fourth time window; and
generate the second sub-frame information by updating a detection result of the at least one sensor in the third time window and the fourth time window, and the first sub-frame information stored in the memory.

5. The depth map generation apparatus of claim 1, wherein the processor is further configured to, based on a determination that the object is not detected during the acquisition time, stop generating additional sub-frame information.

6. The depth map generation apparatus of claim 5, wherein the processor is further configured to determine that the object is not detected when no light is received by the at least one sensor in the acquisition time.

7. The depth map generation apparatus of claim 4, wherein the processor is further configured to, based on the generated second sub-frame information, determine in which one of the third time window and the fourth time window the object is detected.

8. The depth map generation apparatus of claim 7, wherein the processor is further configured to:
based on a determination that the object is detected in the third time window,
divide the third time window into a fifth time window and a sixth time window; and
generate third sub-frame information by updating a detection result of the at least one sensor in the fifth time window and the sixth time window and the second sub-frame information stored in the memory.

9. The depth map generation apparatus of claim 8, wherein the processor is configured to transmit the first sub-frame information, the second sub-frame information, and the third sub-frame information to an external processor in a form of a data packet of a single bit.

10. The depth map generation apparatus of claim 8, wherein the processor is further configured to stop generating additional sub-frame information based on a determination that a length of the fifth time window or the sixth time window is less than or equal to a preset length.

11. A depth map generation method comprising:
dividing an acquisition time of at least one sensor of a plurality of sensors configured to detect a received light arrival time into a first time window and a second time window;
generating first sub-frame information based on a detection result of the at least one sensor in the first time window and the second time window;
determining in which one of the first time window and the second time window an object is detected, based on the first sub-frame information;
generating second sub-frame information from the one of the first time window and the second time window in which the object is detected; and
providing the first sub-frame information and the second sub-frame information for generation of an image frame that comprises depth information of the object.

12. The depth map generation method of claim 11, further comprising:
dividing the first time window into a third time window and a fourth time window based on a determination that the object is detected in the first time window; and
generating the second sub-frame information by updating a detection result of the at least one sensor in the third time window and the fourth time window and the first sub-frame information.

13. The depth map generation method of claim 11, further comprising stopping generating additional sub-frame information based on a determination that the object is not detected during the acquisition time.

14. The depth map generation method of claim 12, further comprising determining in which one of the third time window and the fourth time window the object is detected, based on the second sub-frame information.

15. The depth map generation method of claim 14, further comprising:
dividing the third time window into a fifth time window and a sixth time window based on a determination that the object is detected in the third time window; and
generating third sub-frame information by updating a detection result of the at least one sensor in the fifth time window and the sixth time window and the second sub-frame information.

16. A depth map generation system comprising:
a sensor array comprising a plurality of sensors configured to detect a received light arrival time;
a control circuit array comprising a plurality of control circuits respectively corresponding to the plurality of sensors;
a first processor operatively connected to the sensor array and the control circuit array, and configured to:
divide an acquisition time of at least one sensor of the plurality of sensors into a first time window and a second time window;
generate first sub-frame information based on a detection result of the at least one sensor in the first time window and the second time window;
determine in which one of the first time window and the second time window an object is detected, based on the first sub-frame information;
generate second sub-frame information from the one of the first time window and the second time window in which the object is detected; and
a second processor operatively connected to the first processor, and configured to receive the first sub-frame information and the second sub-frame information from the first processor, and generate an image frame that comprises depth information of the object, based on the first sub-frame information and the second sub-frame information received from the first processor.

17. The depth map generation system of claim 16, wherein the first processor is further configured to transmit the first sub-frame information to the second processor via a network that connects the first processor to the second processor.

18. The depth map generation system of claim 17, wherein the first processor is further configured to transmit the first sub-frame information to the second processor in a form of a data packet of a single bit.

19. The depth map generation system of claim 16, wherein the first processor is further configured to:
   divide the first time window into a third time window and a fourth time window, based on a determination that the object is detected in the first time window; and
   generate the second sub-frame information by updating a detection result of the at least one sensor in the third time window and the fourth time window, and the first sub-frame information stored in a memory of the depth map generation system.

20. The depth map generation system of claim 16, wherein the second processor is further configured to stop generating additional sub-frame information based on a determination that the object is not detected during the acquisition time.

* * * * *